United States Patent [19]
Surauer et al.

[11] Patent Number: 5,597,143
[45] Date of Patent: Jan. 28, 1997

[54] PROCESS AND A DEVICE FOR CONTROLLING THE ATTITUDE OF A THREE-AXIS STABILIZED SPINNING SPACECRAFT

[75] Inventors: Michael Surauer, Chieming; Helmut Bittner, Munich, both of Germany

[73] Assignee: Deutsche Aerospace AG, Germany

[21] Appl. No.: 204,325

[22] PCT Filed: Sep. 4, 1993

[86] PCT No.: PCT/EP92/02050

§ 371 Date: Jun. 10, 1994

§ 102(e) Date: Jun. 10, 1994

[87] PCT Pub. No.: WO93/04924

PCT Pub. Date: Mar. 18, 1993

[30] Foreign Application Priority Data

Sep. 6, 1991 [DE] Germany ............ 41 29 628.1

[51] Int. Cl.$^6$ .......................................... B64G 1/24
[52] U.S. Cl. .......................................... 244/164; 244/170
[58] Field of Search .......................... 244/164, 165, 244/169, 170, 171

[56] References Cited

U.S. PATENT DOCUMENTS

| | | | |
|---|---|---|---|
| 3,937,423 | 2/1976 | Johansen | 244/169 |
| 4,174,819 | 11/1979 | Bruderle et al. | 244/170 |
| 4,424,948 | 1/1984 | Muhlfelder et al. | 244/170 |
| 5,042,752 | 8/1991 | Surauer et al. | 244/170 |

*Primary Examiner*—Galen L. Barefoot
*Attorney, Agent, or Firm*—Evenson, McKeown, Edwards & Lenahan P.L.L.C.

[57] ABSTRACT

The invention provides an improved process and apparatus for controlling the attitude of a three-axis stabilized spacecraft. Separate dead zone elements are used to define threshold values for limiting nutation amplitude and deviation of the spin direction of the spacecraft from a desired orientation, and a continuous check is performed to determine whether the nutation amplitude and deviation of the spacecraft exceed the threshold values. A control intervention is initiated to reduce the nutation, even when the spin direction is within the range limited by the applicable threshold value.

4 Claims, 10 Drawing Sheets

PROCESS AND A DEVICE FOR CONTROLLING THE ATTITUDE OF A THREE-AXIS STABILIZED SPINNING SPACECRAFT

The invention relates to the improvement of devices for controlling the spinning direction and damping of nutation vibrations of spacecraft which have a stored spin. Various devices have become known for controlling the desired value and stabilizing the vibrations of spinning bodies, which are freely movable about their rotatory axes, with respect to two body axes (X-, Z-axes), which are situated transversely to the spinning axis, by means of one or several attitude sensors, which measure the angular deviations of the first (X-) and/or second lateral axis (Z-axis) from its desired attitude, and actuators, such as reaction nozzles which generate controlling torques about one or both lateral axes, in particular, operate discontinuously and whose control interventions cannot fall below preset minimal pulse increments. One of these devices, specifically the one known from International Patent Document WO89/02622, is characterized in that, from the measuring signals for the deviations ($\epsilon_\phi$, $\epsilon_\psi$) of one or both lateral axes from their desired angular position, signal fractions are formed which are separated via regulator networks and which are representative of the orbital movement or spinning direction in space ($\phi_0$, $\psi_0$) or for the nutation movement ($\phi_N$) and are linked in the spin and nutation regulators in such a manner that the first-mentioned signal fraction determines the size or number and preceding signs of the control interventions, and the second signal fraction, which represents the nutation movement ($\phi_N$) is responsible for the points in time or the phase angle ($\beta_N$) of the control interventions within a nutation period.

The present invention relates to improvements of devices for the lateral axis control of the above-mentioned type. The reason is that these devices have some significant deficiencies:

According to the characteristics of such devices, a control intervention is triggered only when the spinning deviation from the normal line of the path ($H_X$, $H_Z$) in space—illustrated by the orbital movement fraction ($\phi_0$, $\psi_0$) of the deviation signals—exceeds predetermined threshold values ($d_\phi$, $d_\psi$) preset by dead zones, irrespective of how large the nutational vibration amplitude ($A_N$) may be which is superimposed on the orbital movement fraction. It is known that, in the case of communication or application satellites, for maintaining the inclination of the orbit and the attitude of the spacecraft on its path, path correcting maneuvers must be carried out at regular intervals in the course of which environmental torques act upon the spacecraft which are by approximately 5 powers of ten higher than in the normal operation of the satellite and therefore result in a correspondingly violent actuating of the reaction nozzles for generating controlling torques about all spacecraft axes. After their end, considerable nutation amplitudes may occur according to the size and time-related assignment of the control pulses last emitted about the lateral axes in the phase of the transition to the normal-operation control of the type existing here, while, at the same time, the position of the spin vector is arbitrary, particularly also within the above-mentioned dead zone limits, which do not trigger control interventions before they are exceeded, which control interventions will then, however, also equally cause an optimal reduction of nutation. For a typical three-axis stabilized satellite equipped with a fixed spin wheel of nominally 50 Nms and in the case of an environmental torque of $10^{-5}$ Nm under normal operating conditions, for example, such a residual nutation vibration, which is subjected to no passive or active damping, would continue to exist for up to 1, 2 hours if the spin orientation were just within a permissible dead zone range of 0.025°, specifically until the spin deviation has travelled from one response threshold (such as $-d_\phi$) to another ($+d_\psi$). In the case of higher response thresholds, the time periods would be correspondingly longer. During this time, the alignment error availability for the attitude control would be impaired in an undesirable manner by the undamped residual nutation.

Furthermore, the exclusive use of reaction nozzles for the control of the lateral axis movement of such spacecraft basically has certain disadvantages and risks. The generating of controlling torques by means of chemical power units is necessarily connected with the consumption of fuel which impairs the duration of the mission when the fuel reserves are limited. Furthermore, at least the reaction nozzles which generate controlling torques about the lateral axes of the vehicle, together with the pertaining line system, the valves and the like, must remain activated during the whole service life which may result in "leakage losses" of fuel and to losses of reliability, for example, when small dirt particles contained in the fuel settle in the on/off-valves or the line connections and valve connections have leakages. Therefore, in application satellites, for the control about the lateral axes in the normal operation, additional other actuators, such as reaction wheels, spin wheels in a V-configuration or gimbals for the adjustment of the stored spin, with respect the spacecraft axes, magnetic torque generators and the like are provided either individually or in appropriate combinations which generate, in particular, continuously adjustable controlling torques and in conventional systems require separate regulators of a different structure and different parameters. In the transition phase to the normal operation with a different regulator configuration or actuator configuration, because of transient effects, significant alignment errors will occur temporarily, for the reduction or suppression of which, frequently additional transition regulators must be used which increases the complexity of the control system in an undesirable manner. When reaction wheels or gimbal-mounted spin wheels are used, normally the spin resulting from exterior environmental torques and accumulated in the lateral axes must be discharged when permissible maximal values are exceeded; for example, via the above-mentioned magnetic torque generators or by means of reaction nozzles, preferably during the periodically required path correcting maneuvers, for the implementation of which the activating of reaction power units is necessary in every case. The latter possibility particularly presents itself when newer propulsion systems are used, such as ion engines, arcjets and the like which, although they have a considerably higher specific impulse, they at the same time also have a lower thrust level, which is why in these cases path corrections much be carried out much more frequently; for example, on a daily basis for time periods that last hours.

The invention has the object of providing improved devices of the above-mentioned type which, under all conditions, ensure an optimal, that is, a rapid and fuel-saving nutation damping, particularly in the transition phase after path correcting maneuvers also when the orientation of the spin vector in space is within the preset permissible limits. At the same time, the device must also be usable for the regulating of the lateral axes in the normal operating phase which follows while continuously operating actuators of a different type are used, without the occurrence of additional transient effects and transition errors. According to the invention, this is achieved in that the deviation of the spinning direction in space ($H_Z$, $H_X$) as well as the nutation amplitude ($A_N$) are continuously monitored by means of separate dead zone elements with respect to an exceeding of preset threshold values ($\pm d_\phi$, $\pm d_\psi$, $d_N$) and, according to regularities, which will be explained in greater detail below, control interventions are triggered only for the purpose of reducing nutation also when the spacecraft spin vector is within predetermined admissible limits ($\pm d_\phi$, $\pm d_\psi$). In a further development of the invention, the signals formed for the spin control and the nutation damping of the mentioned type, while avoiding transition disturbances, are directly used further in the transition phase for the reduction of a possibly still existing residual nutation as well as in the subsequent phase of the normal-operation control by means of different actuators of the above-mentioned type which, in particular, operate continuously.

The essential characteristics of the invention will be explained in detail in the following by means of embodiments.

Figure 1:
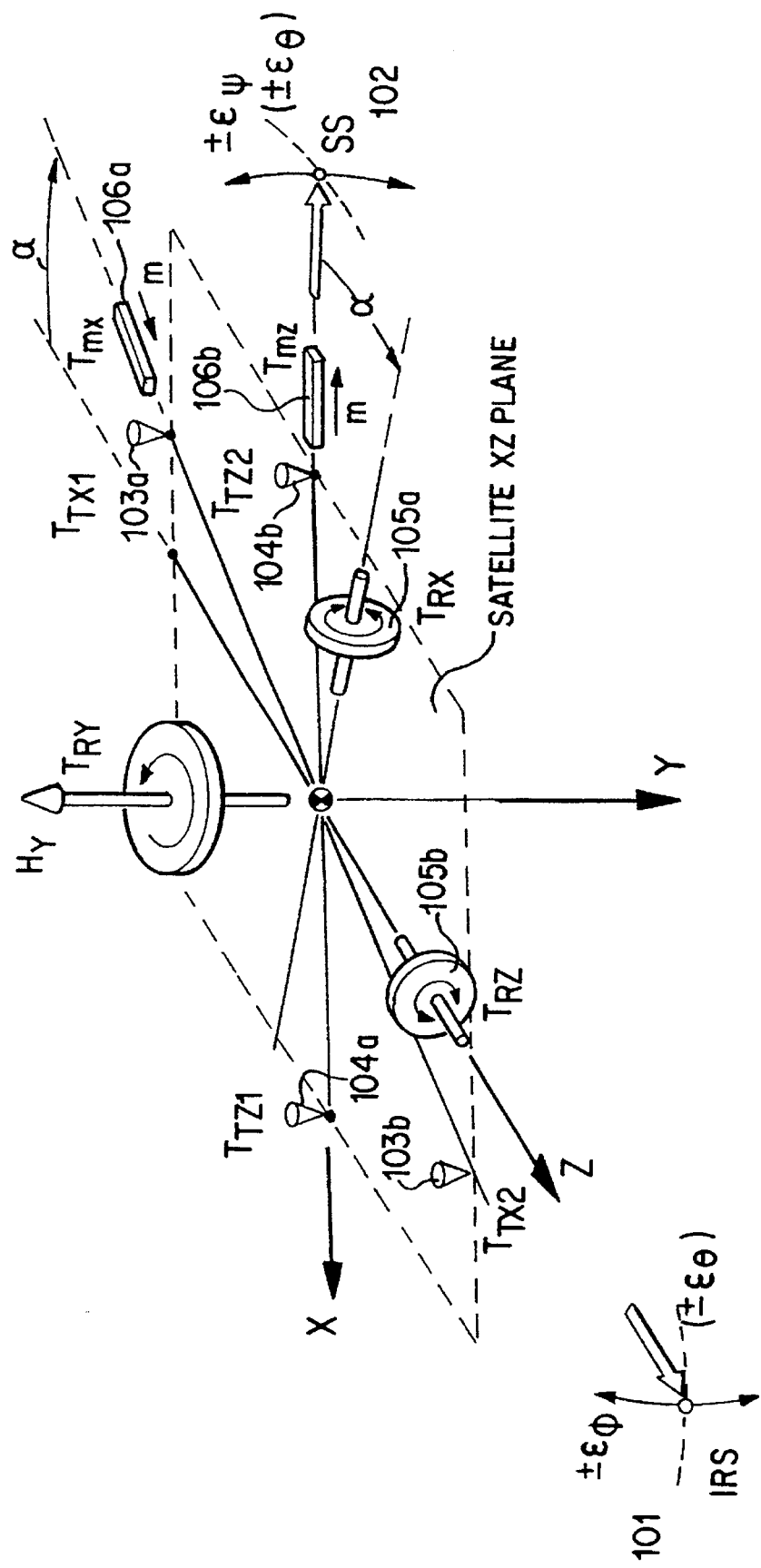
FIG. 1 is a schematic diagram of basically possible arrangements of measuring elements and actuators in a three-axis stabilized satellite with a stored spin.

FIG. 1 illustrates an arrangement, which is possible in principle, of measuring elements and actuators for the sensing and controlling of the lateral axis movement (X-, Z-axis) of a vehicle with a stored spin ($H_Y$), represented by a fixedly installed spin wheel 107, by means of which, in a known manner, the controlling of the vehicle is implemented about its third axis (y-axis) which will not be further discussed in the following. In the nominal orientation, the vehicle Z-axis must point to the center of the earth; the X-axis must point in the moving direction; and the Y-axis must point perpendicularly to the orbital plane into the southern direction. Attitude errors about the X-axis $\epsilon_\phi$) may be measured, for example, by means of an earth infrared sensor 101 oriented in the Z-direction of the vehicle; deviations about the Z-axis of the vehicle can be measured in wide ranges by suitable arrangements of sun sensors whose optical axes are arranged in parallel to the X-Z plane of the satellite in different directions and of which only one pointing in the X-axis direction is indicated as a replacement in FIG. 1. It is known that a continuous rolling and yaw reference can also be obtained by means of star sensors, preferably with a viewing direction toward the north (Polaris) or the south (Canopus). As the actuators, FIG. 1 indicates the power units 103a, 103b and 104a, 104b for generating generally pulse-type controlling torques about the vehicle roll (X-axis) or yaw axis (Y-axis) as well as reaction wheels 105a, 105b and magnetic torque generators 106a, 106b which, when they are controlled correspondingly, are suitable for generating pulse-type as well as continuous controlling torques about the X-axis and the Z-axis of the vehicle. For implementing the WHECON principle, which permits in a known manner the stabilization of a spinning vehicle about both lateral axes by means of a sensor which measures the deviation about only one body axis (X-axis,$\epsilon_\phi$) the actuators 103a, 103b, 105a, 106a) which generate torques about the X-axis of the vehicle—as illustrated in FIG. 1—may be arranged, particularly in the X/Z-plane of the vehicle, rotated about an angle ($\alpha$=WHECON-angle) so that, when they are actuated, a torque component with an opposite preceding sign is at the same time formed about the Z-axis of the vehicle. However, as a replacement, the actuators which generate torques about the X-axis and the Z-axis of the vehicle may at the same time also be acted upon by corresponding control commands which cause the desired coupling of the torques. Naturally, instead of the reaction wheels shown here as an example, spin wheels which are gimbal- mounted about one or two axes, fixedly installed spin wheels in a V-configuration individually or combined with reaction wheels may also be used in a corresponding arrangement. The technical equipment according to FIG. 1 only has the purpose of serving as an example for explaining the operating principles of the invention.

Figure 2A:
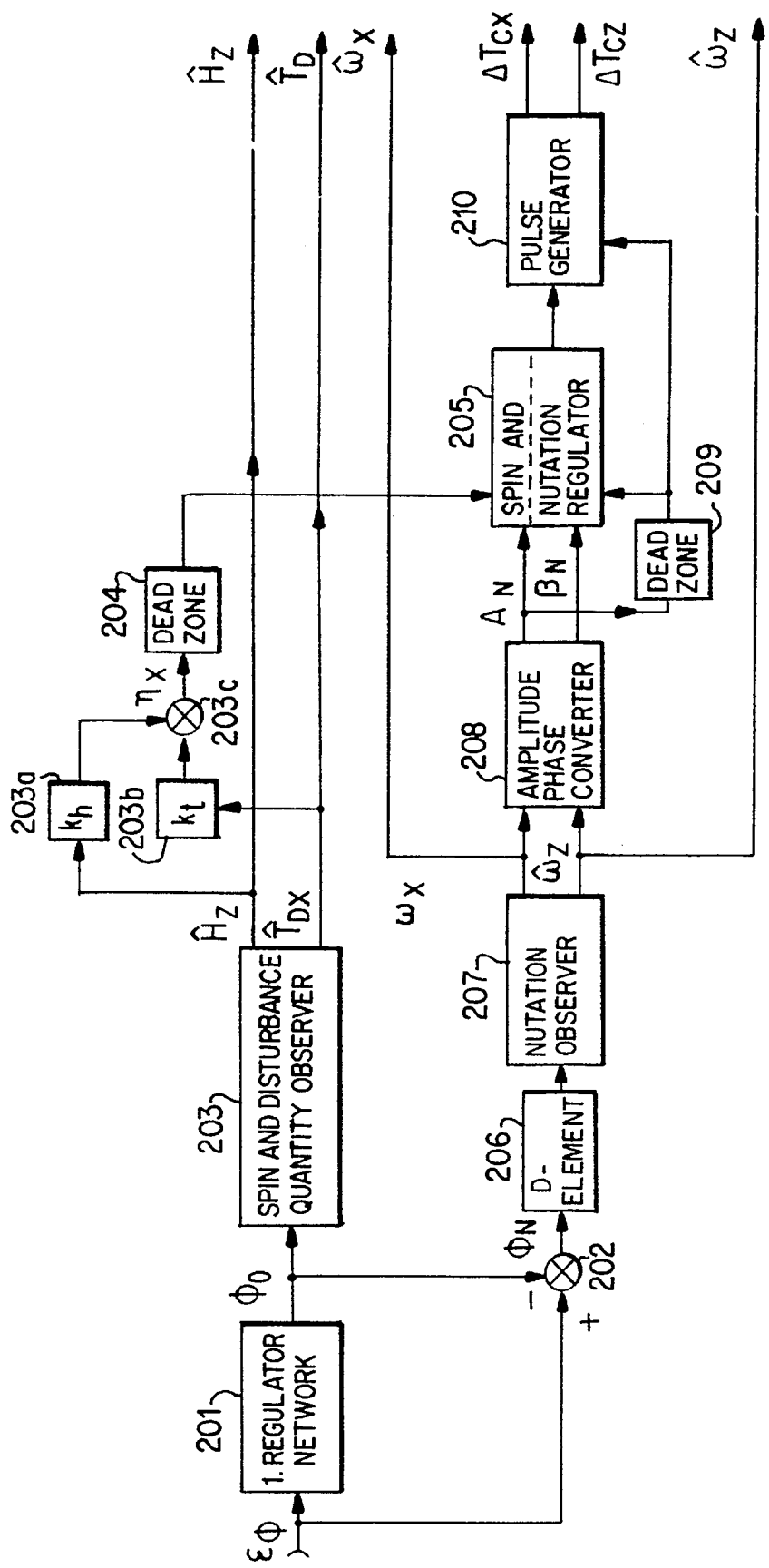
FIG. 2a is a simplified block diagram of a device for controlling the spin and nutation according to the invention when using an attitude sensor which measures the angular position about only one lateral axis (X-axis)

The block diagram according to FIG. 2a has the purpose of making the operating principle of the present invention understandable. The most important functional elements are illustrated schematically for the simplest case of a spinning and nutation control device of the type considered here for the stabilization of both lateral axes of the vehicle by means of only one attitude sensor (101 according to FIG. 1) which measures the angular error ($\epsilon_\phi$) about the first axis (X-axis). In a known manner, a signal fraction ($\phi_O$), which is representative of the path movement is formed from the deviation signal ($\epsilon_\phi$) by way of a first regulator network 201, and a signal fraction ($\phi_N$), which is representative of the nutation movement of the vehicle is formed by subtraction from the input signal ($\epsilon_\phi$) via a summation point 202. Via spinning and disturbance quantity observers 203 of different complexities, according to the type of construction, also in a known manner, estimated values are formed for environmental torques ($T_{DX}$) and at least one component of the vehicle spin ($H_Z$) is formed, the linear combination ($\eta_X$) of which, formed via suitable correction factors 203a, 203b and a summation point 203c, after passing through a dead zone element 204, is further processed in a spin and nutation regulator 205. By means of the phase angle ($\beta_N$) of the nutation vibration, the nutation regulator determines the points in time for the triggering of the control interventions ($\Delta T_{CX}$, $\Delta T_{CZ}$) according to criteria which are a function of the ratio of the nutation amplitude ($A_N$) to the pulse increment ($\Delta P_X$);

the number of control pulses per nutation period (1 or 2).

The mathematical conditions found in European Patent Document WO 89/02622 for determining the optimal control interventions of the known type, that is, for the simultaneous regulating of the spin and the nutation, are compiled again in the enclosure for the purpose of completeness. The nutation amplitude ($A_N$) and the nutation phase ($\beta_N$) are obtained from the above-mentioned signal fraction ($\phi_N$) representative of the nutation movement, for example, via differential elements 206, nutation observers 207 and amplitude/phase converters 208. The formation of angular speed signals for the nutation vibration from the deviation measurement via differential elements and nutation observers will naturally not be necessary when, in the presence of velocity gyros, the angular velocity about one or both lateral vehicle axes can be measured directly. Control interventions must now take place in a known manner when the permissible spin deviation ($\pm d_\phi$) is exceeded and when the phase angle ($\beta_N(t)$) of the nutation movement assumes the optimal value for the simultaneous nutation reduction:

$$\gamma_0 + \Delta\gamma - \Delta\beta \leq \beta_N(t) \leq \gamma_0 + \Delta\gamma + \Delta\beta \qquad \text{(Equation 1)}$$

wherein $\Delta\beta$ represents a permissible tolerance range (for example, 0.1 radiant) about the exact intervention point, and the values of $\gamma_0$ and $\Delta\gamma$, as a function of the above-mentioned criteria, must be selected as compiled in Table 1a for one or in Table 1b for two control interventions (pulse increments $\Delta P_x$) per nutation period, while taking into account all optimal intervention possibilities during a full nutation period ($0 \leq \beta_{N1} \leq 2\pi$). The respective two phase angles ($\beta_{N2}$) for the second pulses take the circumstance into account that the time or phase interval ($\Delta\beta_{N2}$) which remains until the triggering of the 2nd pulse is shorter ($\Delta\beta_{N2} \leq \pi/k$) than the required transient duration ($T = T_N/2k$, $T_N$—nutation period, k—constant, for example 1 or 2) of the nutation observer or is sufficiently long.

The device according to FIG. 2a differs from the known devices of this type essentially in the following points:

Control interventions must be carried out not only when the path spin component ($\hat{H}_Z$) or the signal fraction ($\phi_0$) representing it exceeds a permissible barrier ($d_\phi$) preset by a dead zone 204, but also for values below this limit if the nutation amplitude ($A_N$) exceeds a second threshold ($d_N$) also preset by another dead zone element 209.

According to a particularly advantageous further development of the invention, the signals ($\hat{H}_Z$, $\hat{T}_{DX}$, $\hat{W}_X$, $A_N$, $\beta_N$) formed for the spinning and nutation control in a known manner and, as indicated above, for the nutation damping in an expanded manner are also used for the control of continuously operating actuators, such as reaction wheels or magnetic torque generators, in two fashions, specifically, by acting upon these actuators by means of pulse-type signals ($\Delta T_{CX}$, $\Delta_{CZ}$) of an adjustable duration and possibly also amplitude (variable $\Delta P$), as indicated in FIG. 2a, by the additional intervention into a pulse generator 210 serving the formation of control pulses via the additional dead zone element 209, which monitors the nutation amplitude, for example, for the fastest possible nutation reduction; and by a direct action by means of the optimal estimated values of the vehicle spin ($\hat{H}_Z$), the environmental torques ($\hat{T}_{DX}$) and the angular velocities ($\hat{W}_X$, $\hat{W}_Z$) which are available anyhow and which, for this purpose, are led out in the schematic representation of FIG. 1 for further use in a manner that will be described in the following.

Figure 2B:
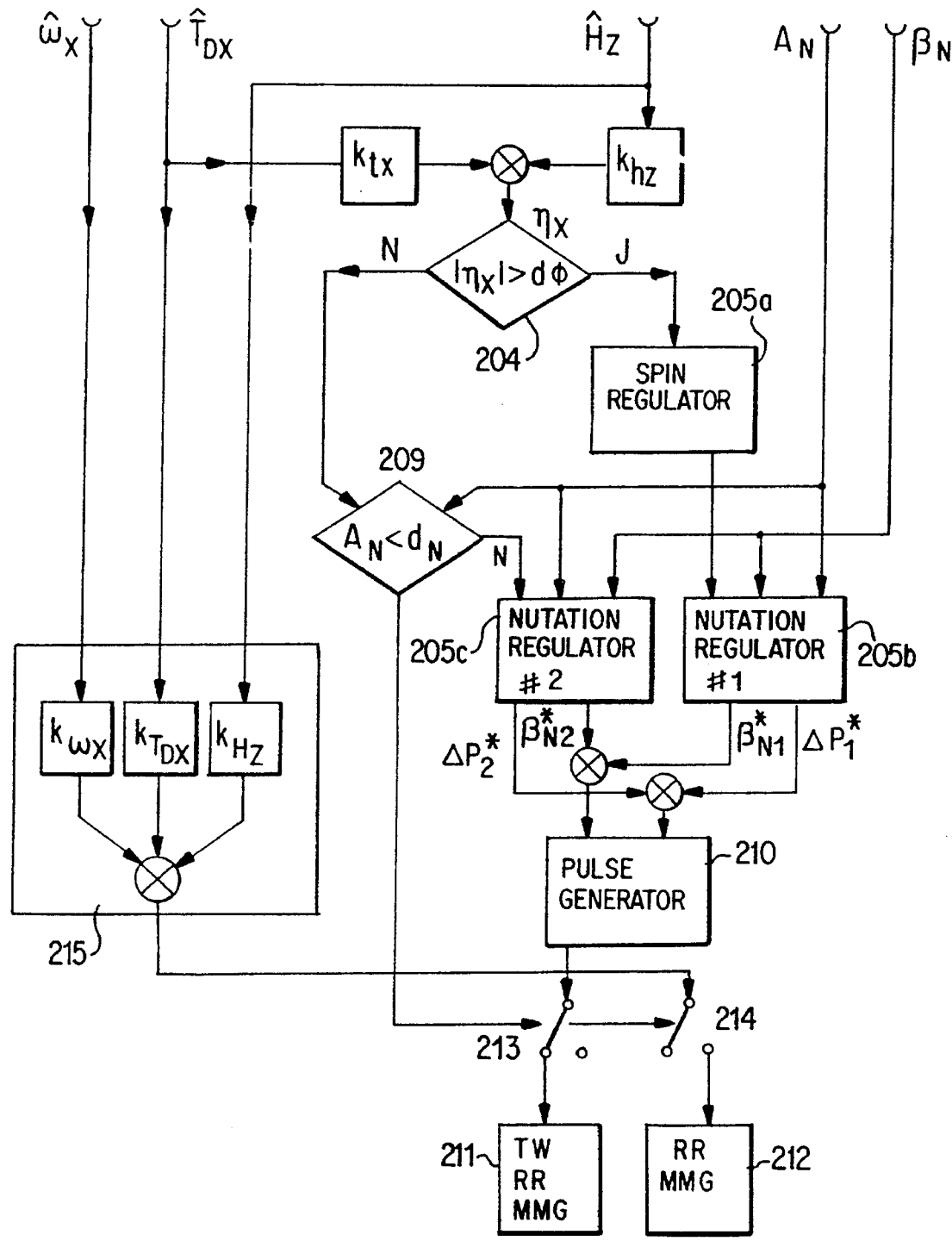
FIG. 2b is a logic diagram for the optimal control of the spin and nutation according to the invention.

The logic diagram according to FIG. 2b is used for a more detailed explanation of the idea of the invention. This logic diagram shows the above-mentioned dead zone elements 204, 209 with their response thresholds ($d_\phi$, $d_N$) as decision elements 204, 209. The decision of the dead zone element 204 has priority; that is, when the signal ($\eta_x$) formed from the spinning deviation and the environmental torque estimation exceeds the permissible response threshold ($d_\phi$) (J=yes; N=no), the operation takes place with the activating of the spin regulator 205a, the nutation regulator No. 1 205b, and the pulse generator 210 to the control of the actuators, such as reaction motors "TW" and/or continuously operating actuators, such as reaction wheels "RR" or magnetic torque generators "MMG" 211 by means of pulse-type signals while taking into account optimal phase conditions for control interventions in a conventional manner if the pulse duration is short in comparison to the nutation period. Later the differences will be discussed with respect to the pulse-type control of actuators, which per se also operate continuously, during time intervals which can no longer be considered short with respect to the nutation period.

In the case of a "no"-decision, that is, when there is no unacceptably high spin deviation (>$d_\phi$), the first dead zone element 204 is followed by the decision element which corresponds to the second dead zone 209 and by means of which it is determined whether the nutation amplitude ($A_N$) is smaller than a preset acceptable barrier ($d_N$). If this is not the case (N-output), a nutation regulator No. 2 205c is activated which operates according to different criteria than in the abovementioned case, which will be explained in the following and the task of which consists of achieving an optimal reduction of nutation by acting upon corresponding actuators by means of also pulse-type signals, without in the process influencing the spin deviation in an unfavorable manner.

When the nutation amplitude ($A_N$) has fallen below the preset permissible value ($d_N$), a change-over takes place via change-over switches 213, 214 from a discontinuous pulse-type control to a continuous control which may be formed, for example, simply from the available signals ($\hat{W}_X$, $\hat{T}_{DX}$, $\hat{H}_Z$) via corresponding amplification factors ($k_{WX}$, $k_{TDX}$, $k_{HZ}$) as the condition regulators while using the continuously operating actuators 212 which have been mentioned several times. This ensures the desired smooth transition to a continuous lateral axis control without undesirable transient effects which are connected with high deviations.

While, in the case of discontinuously operating actuators, such as reaction nozzles, the pulse increment ($\Delta P$) can normally be influenced only via the pulse duration ($\Delta t$), in the case of the pulse-type control of actuators of the type mentioned several times above which also per se operate continuously, the pulse increment can in principle be varied in two manners, specifically via the torque level and the pulse duration. For the time-optimal, that is, fastest possible nutation damping and spin control according to the present invention, it is first assumed that the time duration of the control interventions is influenced while utilizing the maximally available torque level. A typical reaction wheel of 1–5 Nms spin storage capacity can generate, for example, a maximal controlling torque of approximately 0.01–0.1 Nm; a magnetic torque generator of, for example, 100–500 Am$^2$ in the case of a normal strength of the earth magnetic field of $10^{-7}$ Tesla in the geosynchronous orbit even only 1–5× $10^{-5}$ Nm. In contrast, chemical power units have a much higher thrust level of approximately 1–10N and, in the case of a lever arm of typically 1 m, generate a torque of from 1–10 Nm. When the first-mentioned actuators are used, in the case of a full control for generating the same (torque) pulse increments, at least 10 to 100 times the pulse duration is necessary; that is, intervention times which are the less negligible with respect to the duration of a nutation vibration, the lower the available controlling torque level. According to the invention, the general formula of the conditional equation (Equation 1) for the optimal phase angle ($\beta_N(t)$) in the case of pulse-type control interventions remains valid for the combined spin and nutation control of the known type as well as for the nutation damping according to the present expansion, also in the case of long pulse durations, with the difference that the quantity ($\Delta\beta$), which previously had been defined as the fixed tolerance barrier for the point in time of the intervention, in the present case, is defined as follows:

$$\Delta\beta = w_N \Delta t = \arcsin \frac{\sqrt{I_x I_z}}{2 T_{C1}} w_N^2 (A_{N+1} - A_N) \quad \text{(Equation 2)}$$

With:

$$\Delta\beta \leq \pi/2, \text{ preferably } \Delta\beta = \pi/4 \quad \text{(Equation 2a)}$$

wherein $A_N$; $A_{N+1}$—the nutation amplitude ($A_N$) before and after the control intervention ($A_{N+1}$)

$I_x$, $I_z$—moments of inertia of lateral axes $T_{CI} = T_{CX}$, $T_{CZ}$—the controlling torque about the respective (X, Z) axis of the vehicle $W_N$—the nutation frequency $\Delta t$—half the duration of the control pulse and in a known manner, the nutation amplitude ($A_N$) and the nutation phase ($\beta_N$):

$$A_{N+1}; A_N = \sqrt{\frac{\hat{w}_x^2}{w_N^2} + \frac{I_x}{I_z} \frac{\hat{w}_x^2}{w_N^2}} \quad \text{(Equation 3a)}$$

$$\beta_{N+1}; \beta_X(t) = \text{arctg} \sqrt{\frac{I_x}{I_z}} \cdot \frac{\hat{w}_z}{\hat{w}_x} \quad \text{(Equation 3b)}$$

can be obtained from the estimated angular velocities ($\hat{W}_x$, $\hat{W}_z$) of the nutation observer (207, FIG. 2a) before or after the control intervention. Inversely, in the case of a preset torque level ($T_C$), the maximally achievable nutation reduction ($A_{N+1} - A_N$) can be determined by a single control intervention according to:

$$A_{N+1} - A_N = \frac{2 T_c w_x^2}{\sqrt{I_x I_z}} \quad \text{(Equation 2b)}$$

in the case of a maximal value of $\Delta\beta = \pi/2$ or of half a pulse duration $\Delta t$ of a quarter of a nutation period ($T_N/4$). In simpler terms, a longer control pulse of the width $2\Delta\beta$ or of the duration $2 \Delta t$ is distributed symmetrically around the optimal point in time of the intervention. Equation 2 represents a good approximation for the frequent case of approximately identical moments of inertia of the lateral axes ($I_x$, $I_z$).

In the following, criteria of a different type will be explained in detail for control interventions for the priority of nutation damping according to the invention. For a better understanding, the phase conditions for optimal control interventions will first be illustrated by means of geometric representations of the nutation movement in the rolling/yaw plane of the satellite.

Figure 3A:
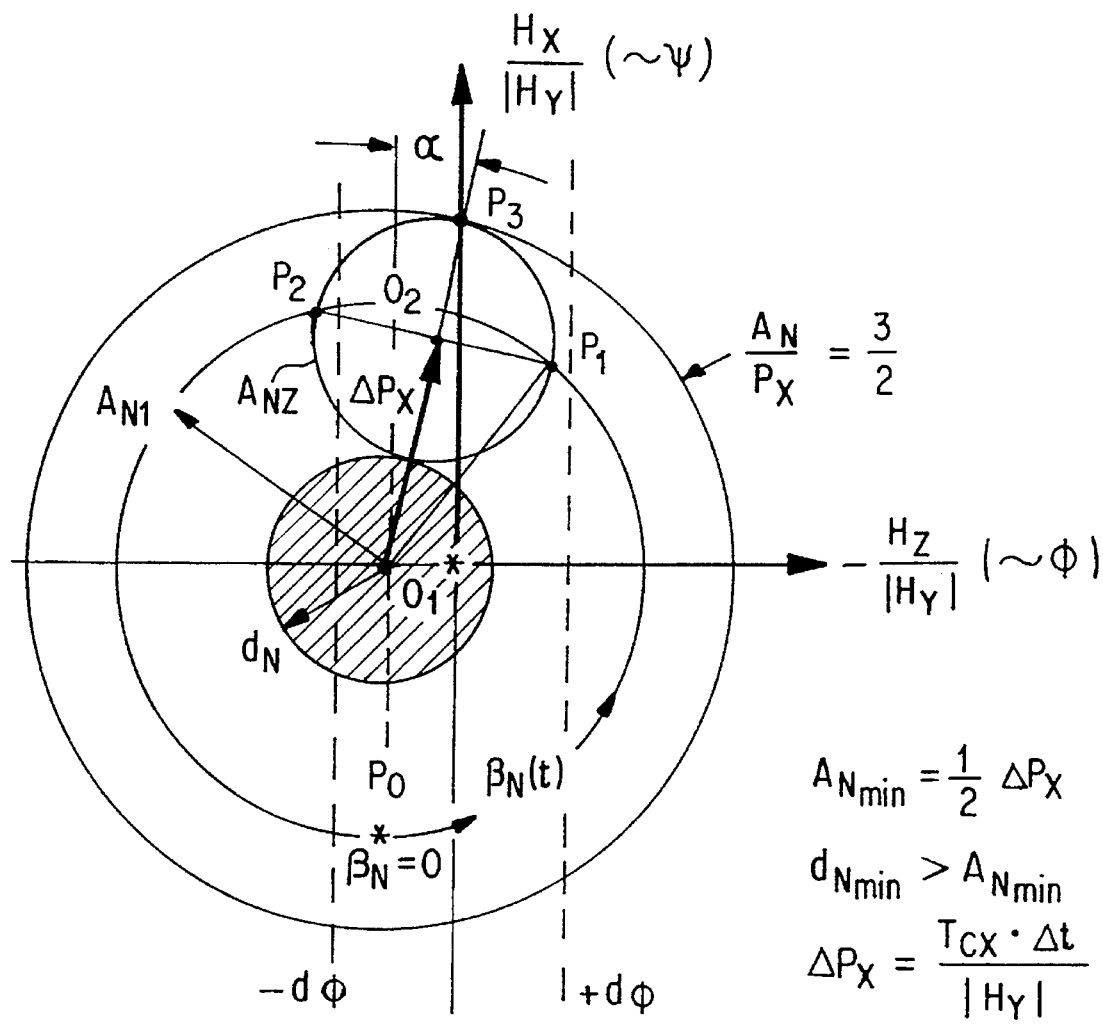
FIGS. 3a to 3c are geometric representations of the phase conditions for one or two control interventions per nutation period about different satellite axes.

FIG. 3 shows the position of the spin vector and the nutation movement in the mutually orthogonal lateral axes of the vehicle, illustrated by the standardized spin components ($-H_z/|H_y|$, $H_x/|H_y|$) or Eulerian angles ($\phi, \psi$) in the orbital plane which correspond to them. Although the spin vector is to be (in point $0_1$) within the preset permissible dead zone limits ($\pm d_\phi$), for example, in the range $-d_\phi \leq (-H_z/|H_y|) \leq 0$, which is why the regulating system of the conventional type does not intervene, the Y-axis of the vehicle, which is orthogonal to the plane of the drawing, moves on a nutational cone ($A_{N1}$) of a large amplitude, which results in correspondingly high undesirable periodic vibrations of the rolling/yaw attitude of the vehicle with the nutation frequency. Generally, the nutation movements are not represented as circles but as ellipses; however, in the present case, for reasons of simplification, identical moments of inertia of the lateral axes ($I_x = I_z = I$) were assumed which applies with a good approximation also in the case of 3-axis stabilized satellites. FIG. 3a also shows, as a hatched area around the spin position ($0_1$), the permissible nutation amplitude ($d_N$) which is preset within the scope of the present invention by means of a second dead zone (309, FIG. 2a). With respect to a time average, a correction strategy with only one pulse per nutation period will then result in the lowest alignment error if the amplitude of the residual nutation is controlled to half the value of a—for example, in the case of reaction nozzles minimally possible (standardized) pulse increment ($\Delta P_x/2$). The standardized pulse increment or spin increment is defined as follows:

$$\Delta P_x = \frac{T_{CX} \cdot \Delta t}{|H_y|} \quad \text{(Equation 4)}$$

wherein $T_{CX}$—controlling torque level $\Delta t$—pulse duration

Otherwise, in the case of the next control intervention, whose amount cannot fall below the minimal pulse increment, a larger residual nutation may remain and therefore a lower alignment precision than the amount which corresponds to half the pulse increment. The direct result is that the response threshold of the second dead zone element 309 must be set at least to this value ($\Delta P_x/2$ in order to avoid limit cycle vibrations with nutation frequency as a result of the 1-pulse nutation damping strategy. In reference to FIG. 3a, the optimal control intervention, which causes a displacement of the spin vector by a standardized pulse increment or spin increment ($\Delta P_x$) in the direction of the torque axis, must take place when the initial nutation circle ($A_{N1}$) intersects with the "target nutation circle" (with the intended residual amplitude $A_{N2} = \Delta P_x/2$) by the new position of the spin vector ($0_2$) after its displacement (by $\Delta P_x$); that is, in the case of phase angles ($\beta_N(t)$) which correspond to one of the two possible intersection points ($P_1$, $P_2$). In the present case, this condition is obviously met at $$\beta_N = \pi - \alpha - |\Delta\gamma|$$

or $$\beta_N = \pi - \alpha + |\Delta\gamma|$$

that is, precisely in the case of the optimal intervention conditions which are known per se (Equation 1 with $\gamma_0 = \pi - \alpha$ and the correctly selected preceding sign of $\Delta\gamma$). The reference quantity ($\gamma_0$) in the general formula of the intervention conditions according to Equation 1 defines the direction of the controlling torque axis (direction $\Delta P$) relative to the selected zero point nutation phase ($\beta_N(t) = 0$. In particular, Table 1a in principle also maintains its validity for the present case, however, with changed criteria for the necessity of a control intervention, as indicated in detail in Table 2a, particularly in the first and second column. Which of the two optimal intervention conditions actually becomes effective depends on the momentary phase position of the nutation movement at the point in time when one of the two barriers for the permissible nutation amplitude (or the spin deviation) is exceeded. FIG. 3a also shows the borderline case $A_N \geq 3\Delta P_x/2$, in which the amplitude-dependent fraction ($\pm \Delta\gamma$) of the optimal phase angle (Equation 1) becomes just equal to 0 (Point $P_3$). Also in this case, for still larger nutation amplitudes, the value ($\Delta\gamma$) 0 applies in every case.

Figure 3B:
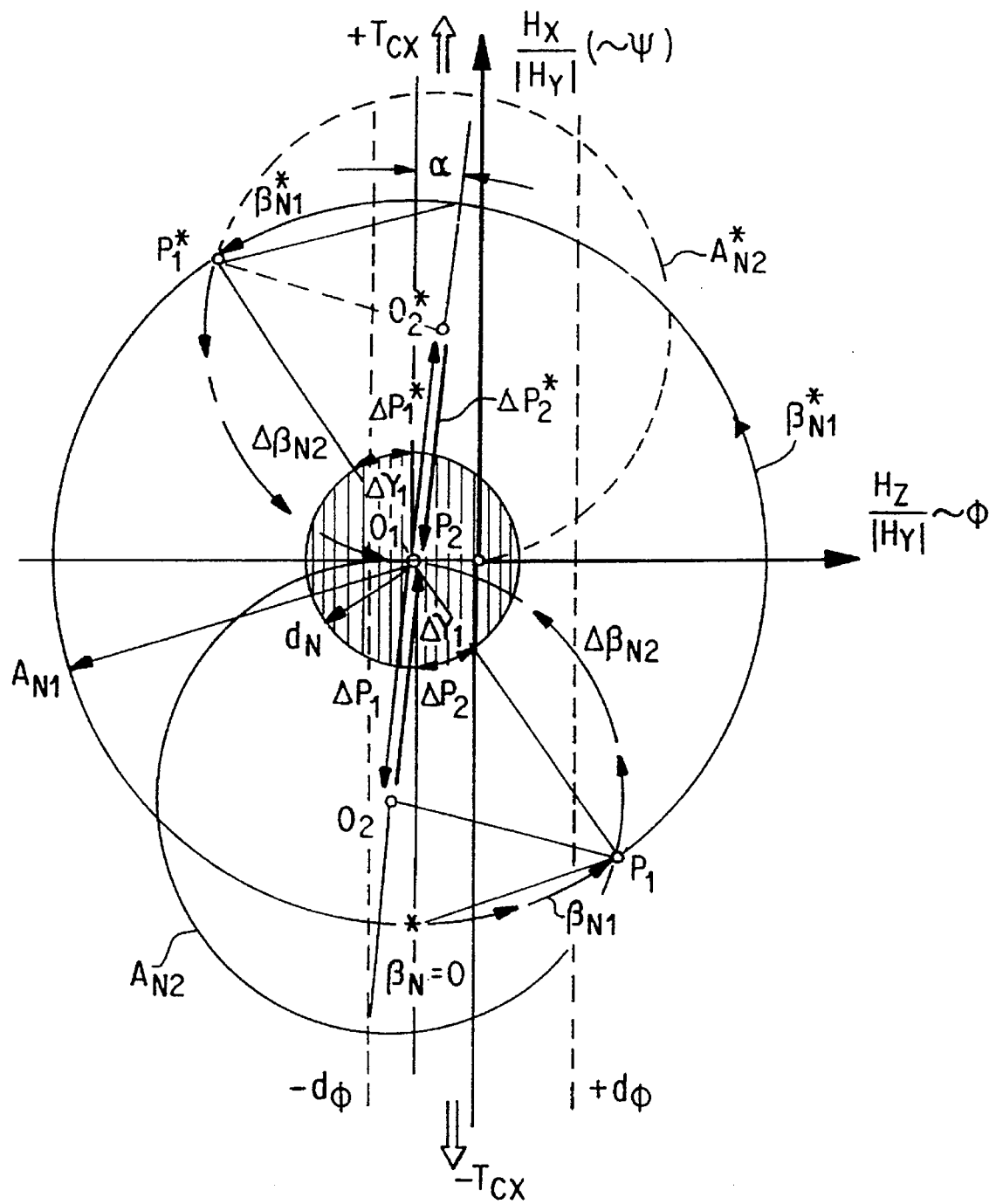

The phase conditions for two control interventions per nutation period about only one vehicle axis (X-axis) are illustrated in FIG. 3b. In this embodiment, it is again assumed that the spin axis direction is within the permissible limits ($\pm d_\phi$, dead zone 204) (Point $0_1$), but the nutation amplitude ($A_{N1}$) exceeds its permissible limit ($d_N$) preset by a second dead zone 209, but still meets the condition $A_{N1} < 2\Delta P$. For the nutation damping according to the invention, in the case of an optimal phase angle ($\beta_{N1}$), a first standardized control pulse ($\Delta P_1 = -\Delta P_X$) is triggered in the negative direction which displaces the spin vector just to such an extent (toward point $0_2$) that the amplitude of the new nutation cone ($A_{N2}$) corresponds just to a minimal pulse increment. When the pulse is triggered, this is the case just in the intersection point ($P_1$) of the old ($A_{N1}$) and the new nutation circle ($A_{N2}$) with the phase angle:

$$\beta_{N1} = \pi - \alpha - \Delta\gamma_1 = \gamma_0 - |\Delta\gamma_z|$$

(Tolerance $\Delta\beta$ neglected). On the new nutation cone ($A_{N2}$), the satellite attitude moves precisely toward the starting position of the spin vector ($0_1$) which it has reached after the end of the phase angle $\Delta\beta_{N2}$ (Point $P_2 = 0_1$). At the point in time which corresponds to this condition, the spin vector is set back to the starting point ($0_1$) by means of a pulse ($\Delta P_2 = -\Delta P_1 = +\Delta P_X$) which is directed opposite to the first pulse. Under ideal conditions, the residual nutation will then be equal to 0. The following relationship can be derived from geometric considerations (in the triangle $0_1 0_2 P_1 P_2$):

$$\Delta\beta_{N2} = \pi - 2\Delta\gamma_1$$

The precalculation of this quantity ($\Delta\beta_{N2}$) permits the decision as to whether sufficient time remains for the nutation observer to form a sufficiently precise new estimated value for the nutation movement ($A_{N2}, \beta_N(t)$), particularly its phase angle. As a function of the observer time constants, that is, of the transient period, it is assumed that this condition is met, for example, for values $\Delta\beta_{N2} \geq \pi/k$, which, for $k=1$, corresponds to half a nutation period and, for $k=2$, corresponds to a quarter of a nutation period. In this case, (with the tolerance width $\Delta\beta$), the new phase angle determined by the nutation observer, is to be used as an intervention criterion for the second pulse, according to the condition:

$$\pi - \alpha - \Delta\beta \leq \beta_{N2}(t) \leq \pi - \alpha + \Delta\beta$$

The phase angle ($\beta_N$) will then count again from the crossover of the new nutation circle ($A_{N2}$).

Otherwise, the second (positive) pulse is emitted at the point in time of the precalculated phase angle $\Delta\beta_{N2} = \Delta\beta_{N2}$ after the triggering of the first pulse. The direction of the effect of the torque increments ($\Delta P$) is counted in the general formula of the intervention condition (Equation 1) again by means of the reference quantity ($\gamma = \pi - \alpha$) from the zero point of the nutation phase ($\beta_N(t) = 0$).

FIG. 3b also shows that there is still a second possibility for control interventions for the damping of nutations which, however, does not lead to the end condition in the shortest possible time (relative to $\beta_N = 0$). When a first control intervention takes place—this time, in the positive direction ($\Delta P_1^* = -\Delta P_1 = +\Delta P_X$)—in the case of the phase angle $\Delta\beta_{N1}^*$ (Point $P_1^*$), which at first displaces the spin vector (from $0_1$ to $0_2^*$) in the opposite direction to the first case and, in the case of the optimal phase angle ($\beta_{N2}^*$) sets it back ($\Delta P_2^* = -\Delta P_1 = -\Delta P_X$) on the then valid nutation circle ($A_{N2}^*$) in the negative direction, the nutation is also damped to the 0 value. FIG. 3b shows clearly that, in the mathematic conditions for the triggering of the first and second pulse, only values of the reference quantity ($\gamma_0$) will then be exchanged. Obviously, in practice, the above-mentioned sequence of the control pulses, in turn, depends on the nutation condition at the point in time when the decision is made concerning the necessity of control interventions on the basis of the permissible threshold values ($d_N$ or $\pm d_\psi$).

For the purpose of completeness, it should be pointed out here that, in the case of nutation amplitudes below a technically perfectly measurable limit (for example, $A_N < a_N$), the nutation observer will not longer be capable of furnishing usable phase angles ($\beta_N(t)$) of the nutation movement. This lower limit depends significantly on the quality of the measuring signals, particularly their resolution capacity (for example, quantization) and/or signal-to-noise ratio. For nutation amplitudes below this minimal value ($a_N$), it is therefore necessary in practice to do without the use of phase information for the triggering of the pulse because otherwise a sporadic actuating of the actuators would be unavoidable. In this case, the triggering of the respective first control intervention according to the size and direction depends exclusively on the spin deviation, that is, the exceeding of the permissible values ($\pm d_\phi, \pm d_\psi$) in one of the two axis direction and can be initiated immediately at any time in the corresponding reference direction ($\gamma_0$).

Figure 2C:
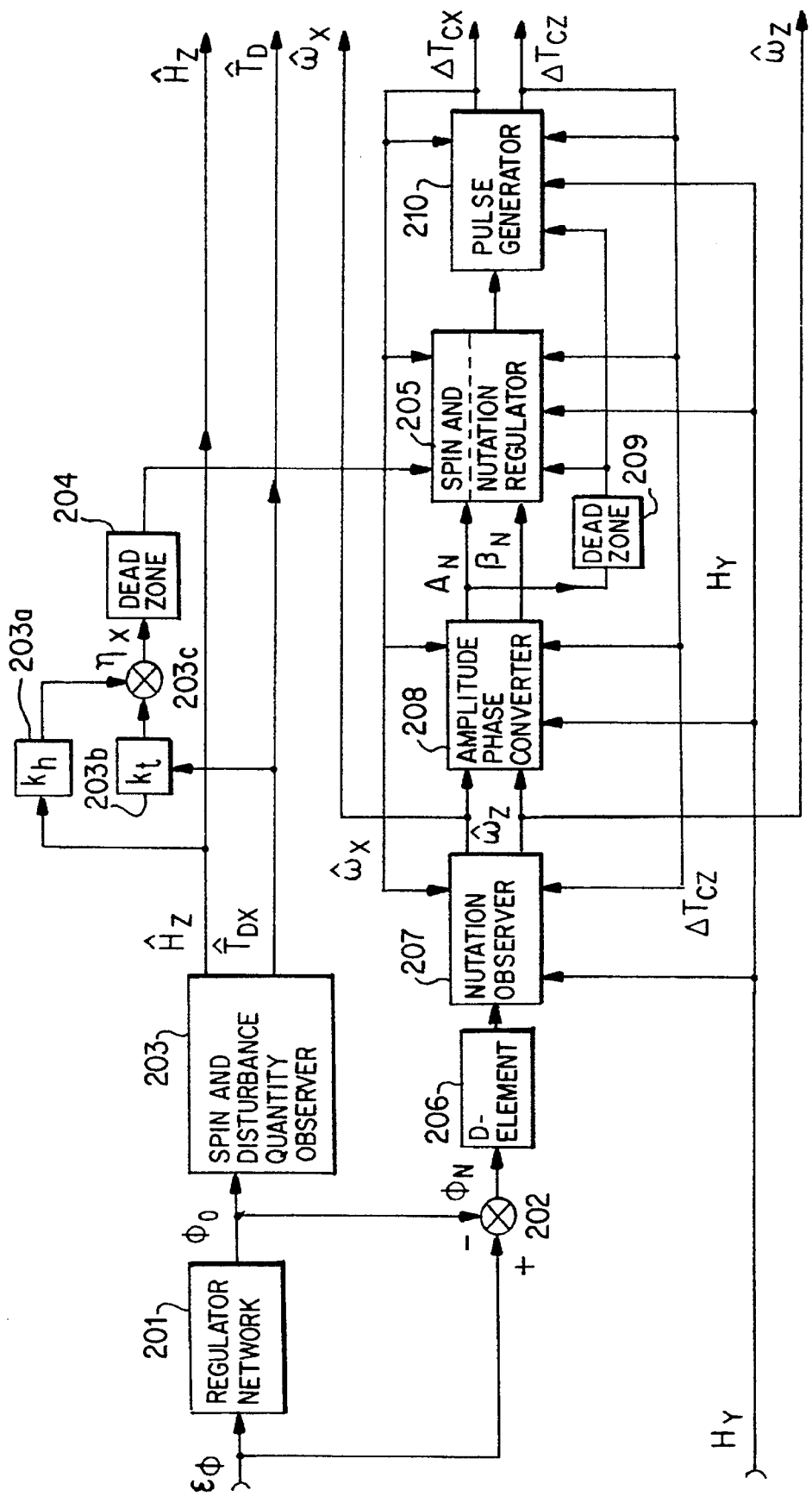
FIG. 2c is a logic diagram according to FIG. 2a with an adaptation to variable system parameters.

The above-mentioned considerations for determining the phase angle for the second control intervention demonstrate directly that nutation observers 207 and amplitude/phase converters 208 must simulate the nutation operation at any point in time as realistically as possible. In a manner that is known per se, this is facilitated according to the functional diagram 2c by the fact that changes of the parameters and dynamic conditions in the system are reported directly to these function elements and are not recognized only later via deviation measurements ($\epsilon_\phi$) of the satellite, for example, by means of an earth infrared sensor and interposed regulator networks 201. As illustrated schematically in FIG. 2c, for this purpose, all available quantities, such as the emitted control signal ($\Delta T_{CX}, \Delta T_{CZ}$) and the actual value of the stored spin ($H_y$), for example, from measurements of the rotational speed of the spin wheel, are introduced into the above-mentioned function elements.

The above-explained conditions for control interventions for the damping of nutations by means of two control pulses per nutation period about a vehicle axis (X-axis) are again illustrated in Table 2b. In the case of a diagonal positioning of the controlling torque generators (about the angle $\alpha$) according to FIG. 3b, it may, under certain circumstances, be more expedient to make the case-to-case decision concerning the sequence of the control interventions for nutation damping dependent on the position of the spin vector within the permissible limits ($\pm d_\phi$). Thus, in the case of the spin deviation according to FIG. 3b (that is, $-d_\phi \leq \phi_0 \leq 0$), the second-mentioned strategy for the nutation damping ($\Delta P_1^*$ at $\beta_{N1}^*, \Delta P_2^*$ at $P_{N2}^*$) may possibly be preferable in order to avoid an exceeding of the spin barrier ($-d_\phi$) after the first control pulse and to avoid a possible intervention of the spin regulator. In Table 2b, this fact is taken into account in that the last-mentioned sequence of control interventions is always indicated first.

Figure 3C:
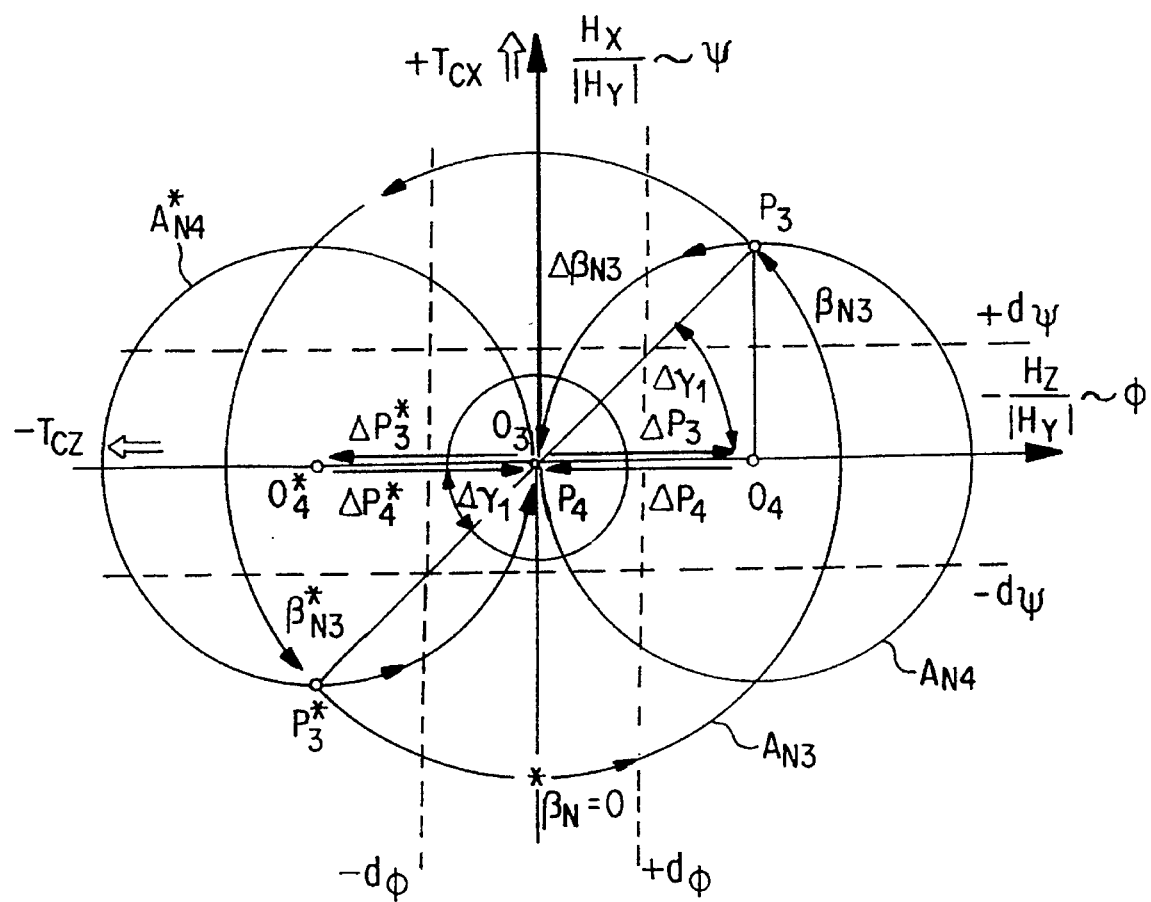

In a representation which is analogous to FIG. 3b, FIG. 3c shows the conditions in the case of control interventions about the second lateral axis of the vehicle (Z-axis). In this case, it is assumed that the actuators are not arranged to be rotated by an angle ($\alpha$) in the X-, Z-plane with respect to the lateral axis of the vehicle for generating a torque coupling. In this context, it should be pointed out again that, when actuators are used for generating torques about both lateral axes of the vehicle, in principle, a diagonal installation of the torque generators about the first axis is not necessary because the simultaneous actuating of the actuators about both axes (while taking into account the correct preceding signs) corresponds to a diagonal installation. FIG. 3c shows—apart from the possible diagonal installation angle ($\alpha$) of the torque generators—a representation rotated by 90° of the nutation movements of FIG. 3b. In addition, the spin deviation was assumed to be zero. In the general form of the intervention conditions according to Equation 1, the reference angle ($\gamma_0$), which is valid for the torque generator axes must then be adapted correspondingly. Although FIG. 3c relates only to the intervention conditions for two pulses about the second lateral axis of the vehicle (Z-axis) and not to the correction of a spin deviation ($H_x/|H_y|\alpha\Phi$) in the X-direction, this drawing also contains a response threshold ($\pm d_\psi$) for the more general case that a deviation measuring ($\epsilon_\psi$) about this vehicle axis or an estimated value for the corresponding spin component ($H_x$) is also available. The considerations for the identification of the intervention conditions are completely analogous with those of FIG. 3b and therefore do not have to be explained again in detail. For the purpose of a differentiation, the corresponding quantities in the nutation diagram ($A_N$, $\beta_N$, $\Delta P$ and the like), in this representation, are provided with different indices (3 instead of 1 for the first pulse; 4 instead of 2 for the second).

Table 2c contains a list of the parameter values for the triggering of nutation damping pulses about the Z-axis while the generally valid relationship for the phase angle of the control interventions according to Equation 1 is used. In the knowledge of the regularities for control interventions about each individual lateral axis for the optimal nutation damping according to the present invention, the person skilled in the art will have no difficulty to select the best regulating strategies for the respective application—as a function of the equipment related possibilities—and combine them with one another, as required.

The possibilities are, for example, as follows:

The triggering of the fastest possible first control intervention about the Z- or Z-axis according to the momentary phase position of the nutation movement, which has the result that the required time ($\Delta T_{max}$) for the nutation damping is no more than:

in the case (two) control interventions about only one axis (for example, the X-axis):

$$(\Delta T_{max})_1 = (1-(\Delta\gamma_1)/\pi)\cdot T_N$$

in the case of an intervention possibility about two lateral axes and 2 control pulses per nutation period $$(\Delta T_{max})_2 = (\tfrac{3}{4}-(\Delta\gamma_1)/\pi)\cdot T_N$$

with $T_N$—nutation period ($2\pi/\omega_N$)

The selection of the torque axis while taking into account the spin deviation such, that
in the case of the single-pulse strategy, the position of the spin vector (within the dead zone ranges ($d_\phi$, $d_\psi$) is improved simultaneously;
in the case of two pulses, the dead zone range ($d_\phi$, $d_\psi$) is not left in the interim.

Adaptation of the pulse increment ($\Delta P$) in the case of large nutation amplitudes ($A_N > 2\Delta P_{min}$) by changing the pulse width (for example, in the case of reaction nozzles) and/or of the torque level (for example, in the case of continuously operating actuators) corresponding to the relationship $$\Delta P = A_N/2$$

in order to achieve a complete nutation reduction by means of maximally 2 pulses.

Figure 4A:
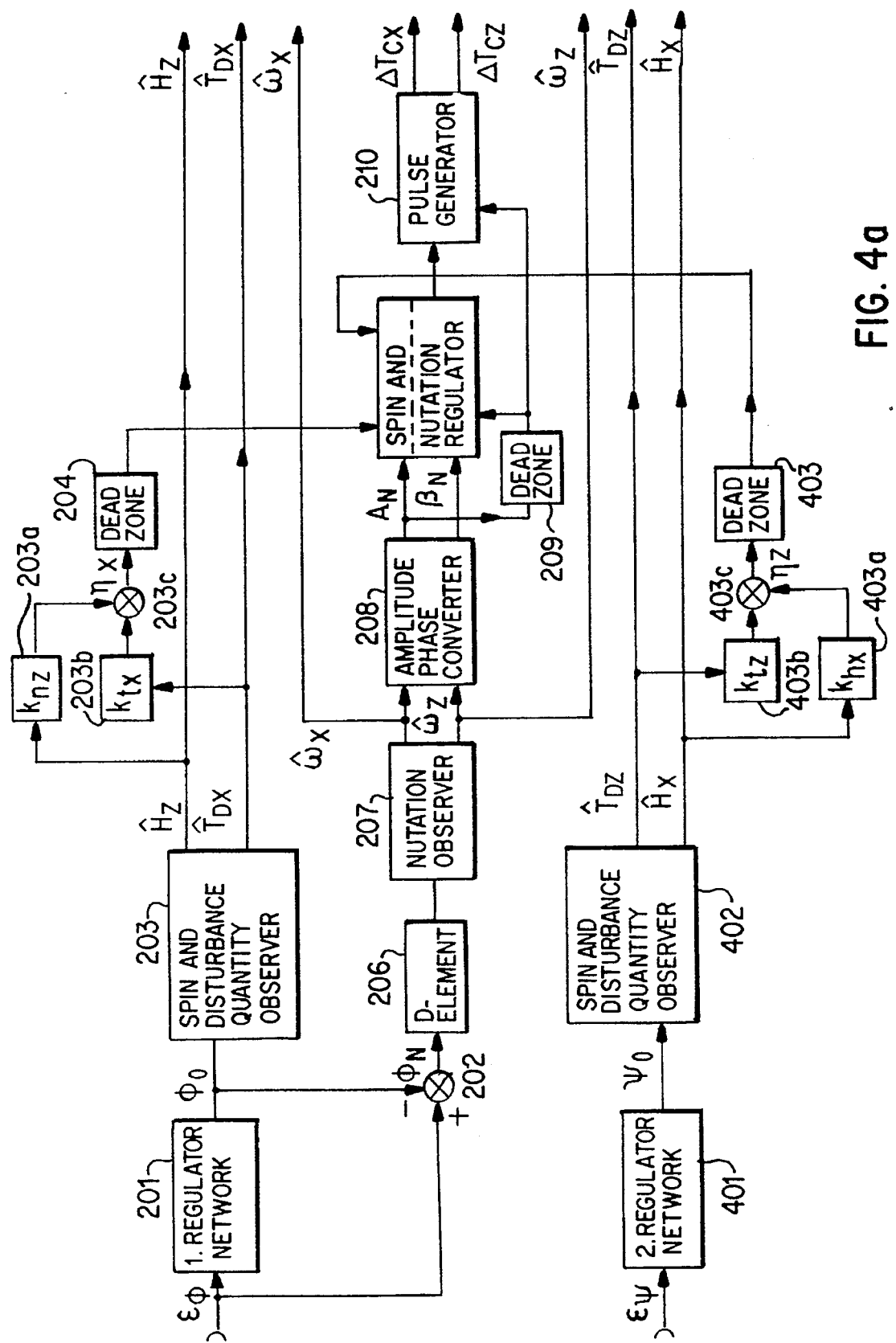
FIG. 4a is a view of the device according to the invention during the measuring and controlling of the attitude about the two lateral axes.

FIG. 4a shows a simplified block diagram of a device for nutation damping and spin control when attitude information is available about both lateral axes of a satellite with a spin storage device. In reference to FIG. 2b, in this case, in the decision concerning interventions for the pure nutation damping in the decision element 204 for the spin deviation, the condition ($|\eta_z| > d_\psi$) must also be examined. In a manner known per se, a signal for the path movement component of the spin vector ($\psi_0$) in the direction of the first vehicle axis (X-axis) is formed from a deviation signal ($\epsilon_\psi$) about the second lateral axis (Z-axis)—for example, by means of sun sensors in a suitable arrangement or by means of star sensors—via a second regulator network 401, and from this signal, via spin and disturbance quantity observers 402, optimal estimated values are formed for the above-mentioned spin component ($\hat{H}_x$) and environmental torques ($\hat{T}_{DZ}$) acting about this vehicle axis, whose linear combination ($\eta_z$) leads to the triggering of control pulses for the correction of the spin axis direction as soon as certain permissible threshold values ($\pm d_\psi$) are exceeded which are predetermined by another dead zone 403. According to a further development of the known arrangement, the obtained estimated values for the spin component ($\hat{H}_x$) and the environmental torques ($\hat{T}_{DZ}$) are used further in a continuous regulator, for example, a regulator which is constructed according to the regularities of a status feedback, for avoiding transition disturbances, as indicated in FIG. 4a by continued signal lines.

Figure 4B:
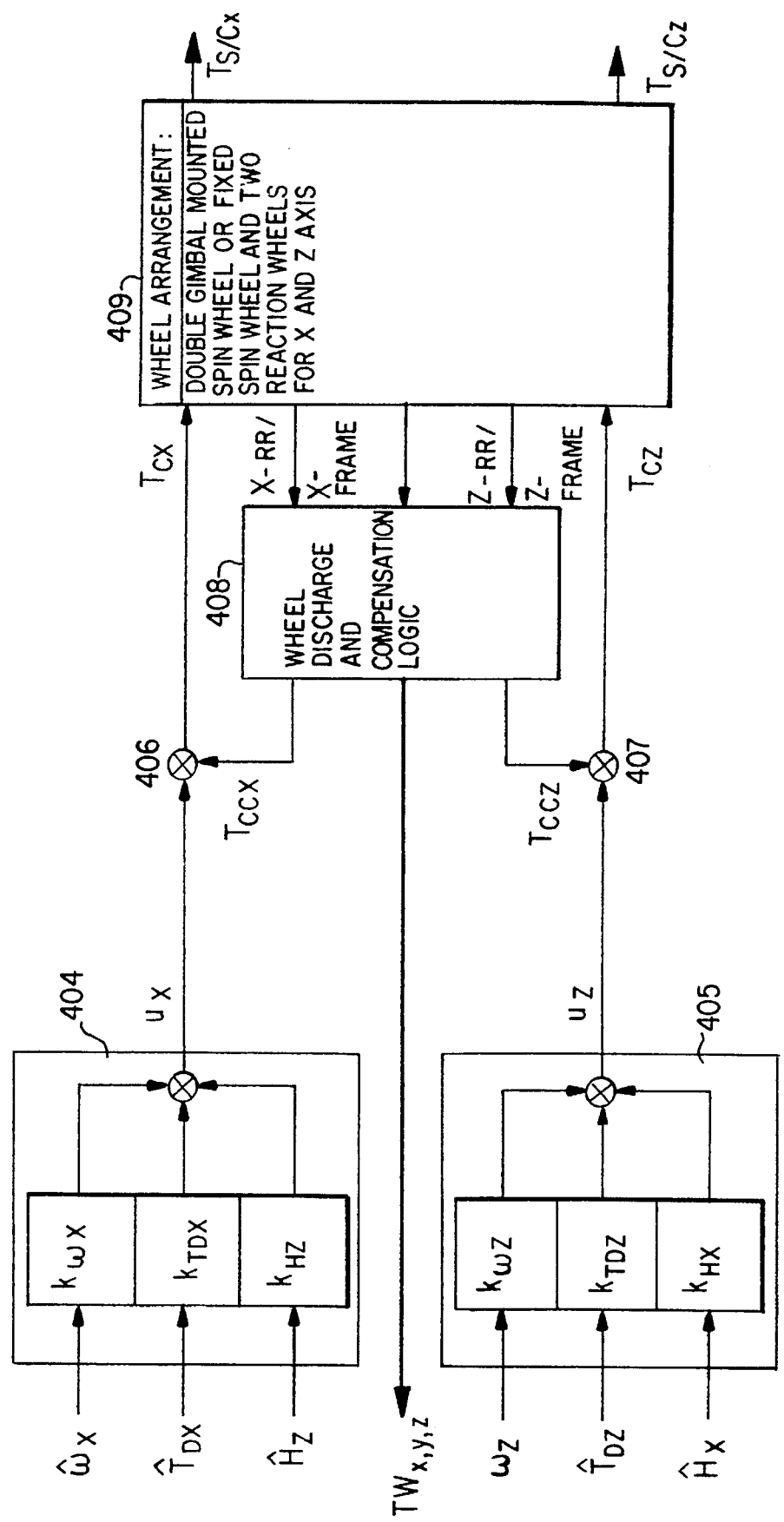
FIG. 4b is a block diagram of a normal-operation control with reaction wheels or gimbal-mounted spin wheels.

FIG. 4b, which is to be considered as a right-hand continuation of FIG. 4a, illustrates an embodiment of such a normal-operation control with different actuators; in this case, a double-gimbal-mounted spin wheel or a fixed spin wheel and two reaction wheels for the lateral axes. The alternative pulse-type control discussed in connection with FIG. 2 of the driving motors for the gimbals or reaction wheels for generating controlling torques about the lateral axes, for example, in the transition phase, for the nutation damping and/or spin control was left out in FIG. 4b for reasons of simplicity but must not be excluded, as a result. For the continuous part of such a control, FIG. 4b schematically shows the formation of control signals for the generating of torques about the vehicle X-axis ($u_X$) from the corresponding relevant estimated values ($H_Z$, $T_{DX}$, $W_X$) via corresponding amplification factors ($k_{HZ}$, $k_{TDX}$, $k_{WX}$) of the "status quantities" for this vehicle axis and analogously the formation of a signal ($u_Z$) for the control of the second gimbal and/or reaction wheel from the estimated values of the status quantities ($H_X$, $T_{DZ}$, $W_Z$), which are relevant for this axis, via pertaining amplification factors ($k_{HZ}$, $k_{TDZ}$, $k_{WZ}$). The lateral-axis reaction torques ($T_{S/CX}$, $T_{S/CZ}$) generated by gimbal adjustments or the acceleration and deceleration of the reaction wheels act upon the satellite. For the discharge of accumulated environmental torques, which result in permanent deflections of the gimbals or a corresponding medium rotational speed of the reaction wheels, when predetermined limit values are reached, in a manner that is also known, actuators, such as reaction nozzles or magnetic torque generators, are engaged which generate exterior torques about the corresponding vehicle axes.

For the compensation of attitude errors because of the pulse-type discharge torques, via a spin wheel discharge and compensation logic 408 and corresponding feedbacks of the discharge signals ($T_{CCX}$, $T_{CCZ}$), via summation points 405, 407, the gimbals or reaction wheels may be set back by equivalent amounts for maintaining the spin balance.

The avoidance of transition errors in the transition phases was already mentioned as a partial object of the present invention. When spin storage devices are used for the vehicle control about the lateral axes as in the present embodiment, according to a particularly advantageous development of the invention, attitude errors during the wheel discharge can be virtually avoided completely without additional equipment-related expenditures, when "solar-sailing" strategies are used which are known per se; that is, by means of generating discharge torques via adjustments of the solar generator orientation with respect to the plane of incidence of the sunlight. As known, when the reaction wheels or gimbals operating as spin storage devices are dimensioned correctly, only the portions of the environmental torques which are constant in a stabilized manner must be discharged, while (in inertial axes; that is stabilized) periodic portions cause only periodic fluctuations of the stored spin around the average 0 value. Particularly high values of the solar pressure torques—so-called "windmill torques"—may be generated particularly by an adjustment of the solar generator panels mounted on the north- and south side in the opposite direction, which panels, however, always act about the (virtually also stabilized) place of incidence of the sunlight. Since, because of the daily rotation of earth-oriented vehicles, stabilized torque components may be represented to be periodically fluctuating in satellite axes, the discharge may take place with the exclusive use of these windmill torques and therefore highly effectively also when the (stabilized) environmental torque vector is not in the plane of incidence of the sunlight but perpendicularly to it. The discharge must then only take place so that it is offset in time by a quarter of an orbiting period. The reason is that then the accumulated spin, which is coupled with the satellite axes by means of equipment, has physically rotated by precisely the above-mentioned 90° in the plane of incidence of the sunlight and can be discharged in the surroundings of this orientation, in which case the discharge moment also varies continuously proportionally with respect to the angle of rotation of the solar generator adjustment, that is, may be adapted to the respective requirements.

TAB. 1a

INTERVENTION CONDITIONS ($\beta_N$) FOR CONTROLLING THE SPIN AND NUTATION BY MEANS OF 1 PULSE PER NUTATION PERIOD

| $\phi \cdot \left( -\frac{H_Z}{\|H_Y\|} \right)$ | $\Delta P = \frac{T_{CX}\Delta t}{\|H_Y\|}$ | $\gamma_0$ [rad] | $\pm\Delta\gamma$[rad] if: $\frac{1}{2} \leq \frac{A_N}{\Delta P_X} \leq \frac{3}{2}$ | $\frac{1}{2} > \frac{A_N}{\Delta P_X} > \frac{3}{2}$ | $\beta_N$ [rad] |
|---|---|---|---|---|---|
| $<-d_\phi$ | + | $\pi - \alpha$ | arc cos $\left( \frac{1}{2} \frac{A_N}{\Delta P} + \frac{3}{8} \frac{\Delta P}{A_N} \right)$ | 0 | $\gamma_0 - \|\Delta\gamma\| \pm \Delta\beta$ or $\gamma_0 + \|\Delta\gamma\| \pm \Delta\beta$ |
| $>+d_\phi$ | − | $2\pi - \alpha$ bzw $-\alpha$ | Approximation: $\sqrt{1-\left(\frac{1}{2}\frac{A_N}{\Delta P}+\frac{3}{8}\frac{\Delta P}{A_N}\right)^2}$ | 0 | $\gamma_0 - \|\Delta\gamma\| \pm \Delta\beta$ or $\gamma_0 + \|\Delta\gamma\| \pm \Delta\beta$ |

TAB. 2a

INTERVENTION CONDITIONS FOR NUTATION DAMPING AT 1 PULSE/NUTATION PERIOD

| $A_N$ | $\phi_0 \left( -\frac{H_Z}{\|H_Y\|} \right)$ | $\Delta P = \frac{T_{CX}\Delta t}{\|H_Y\|}$ | $\gamma_0$ [rad] | $\pm\Delta\gamma$[rad] if: $d_N \leq \frac{A_N}{\Delta P} \leq \frac{3}{2}$ | $d_N > \frac{A_N}{\Delta P} > \frac{3}{2}$ | $\beta_N$ [rad] |
|---|---|---|---|---|---|---|
| $>d_N$ | $-d_\phi$ $< \phi_0 \leq$ 0 | + | $\pi - \alpha$ | arc cos $\left( \frac{1}{2} \frac{A_N}{\Delta P} + \frac{3}{8} \frac{\Delta P}{A_N} \right)$ | 0 | $\gamma_0 - \|\Delta\gamma\| \pm \Delta\beta$ or: $\gamma_0 + \|\Delta\gamma\| \pm \Delta\beta$ |
| $<d_N$ | 0 $\leq \phi_0 <$ $+d_\phi$ | − | $2\pi - \alpha$ bzw. $-\alpha$ | Approximation: $\sqrt{1-\left(\frac{1}{2}\frac{A_N}{\Delta P}+\frac{3}{8}\frac{\Delta P}{A_N}\right)^2}$ | 0 | $\gamma_0 - \|\Delta\gamma\| \pm \Delta\beta$ or: $\gamma_0 + \|\Delta\gamma\| \pm \Delta\beta$ |

TAB. 1b

INTERVENTION CONDITIONS ($\beta_{N1}$, $\beta_{N2}$) AT 2 PULSES ($\Delta P_1$, $\Delta P_2$) PER NUTATION PERIOD (SPIN CORRECTION + NUTATION DAMPING)

| $\phi_0 \left(\sim -\frac{H_Z}{|H_Y|}\right)$ | $\Delta P_1$ | $\Delta P_2$ | $\gamma_0$ [rad] | $\frac{T_C \Delta t}{|H_Y|}$ $\frac{A_N}{2\Delta P} \leq 1$ | $\frac{A_N}{2\Delta P} > 1$ | $\pm\Delta\gamma_1$ [rad] if: | $\beta_{N1}$ [rad] | $\Delta\beta_{N2}$ | $\beta_{N2}$ [rad] if: $\Delta\beta_{N2} \leq \frac{\pi}{k}$ | $\Delta\beta_{N2} > \frac{\pi}{k}$ |
|---|---|---|---|---|---|---|---|---|---|---|
| $<-d_\phi$ | + | + | $\pi - \alpha$ | arc cos $\frac{A_N}{2\Delta P}$ | 0 | | $\gamma_{01} - |\Delta\gamma_1| \pm \Delta\beta$ | $\pi - 2|\Delta\gamma_1|$ | $\Delta\beta_{N2}$ | $\gamma_0 \pm \Delta\beta$ |
| | | | | | | | or | | | |
| | | | | | | | $\gamma_{01} + |\Delta\gamma_1| \pm \Delta\beta$ | | $\Delta\beta_{N2}$ | $\gamma_0 \pm \Delta\beta$ |
| $>+d_\phi$ | − | − | $(2\pi) - \alpha$ | arc cos $\frac{A_N}{2\Delta P}$ | 0 | | $\gamma_0 - |\Delta\gamma_1| \pm \Delta\beta$ | $\pi - 2|\Delta\gamma_1|$ | $\Delta\beta_{N2}$ | $\gamma_0 \pm \Delta\beta$ |
| | | | | | | | or | | | |
| | | | | | | | $\gamma_0 + |\Delta\gamma_1| \pm \Delta\beta$ | | $\Delta\beta_{N2}$ PREDICTION VALUE | $\gamma_0 \pm \Delta\beta$ OBSERVER VALUE |

TAB. 2b

INTERVENTION CONDITIONS ($\beta_{N1}$, $\beta_{N2}$) FOR THE NUTATION DAMPING AT 2 PULSES (ABOUT X-AXIS) PER NUTATION PERIOD

| $A_N$ | $\phi_0 \sim \left(-\frac{H_Z}{|H_Y|}\right)$ | $\Delta P_1$ | $\Delta P_2$ | $\gamma_0$ [rad] | $\frac{T_{CX}\Delta t}{|H_Y|}$ $\frac{A_N}{2\Delta P} \leq 1$ | $\frac{A_N}{2\Delta P} > 1$ | $\pm\Delta\gamma_1$: if | $\beta_{N1}$ [rad] | $\Delta\beta_{N2}$ [rad] | $\beta_{N2}$: if $\Delta\beta_{N2} \leq \frac{\pi}{k}$ | $\Delta\beta_{N2} > \frac{\pi}{k}$ |
|---|---|---|---|---|---|---|---|---|---|---|---|
| $>d_N$ | 0 | − | + | | arc cos $\frac{A_N}{2\Delta P}$ | 0 | | $\gamma_{02} + |\Delta\gamma_1| \pm \Delta\beta$ | $\pi - 2|\Delta\gamma_1|$ | $\Delta\beta_{N2}$ | $\gamma_{01} \pm \Delta\beta$ |
| | $\leq \phi_0 < +d_\phi$ | + | − | | | | | or $\gamma_{01} + |\Delta\gamma_1| \pm \Delta\beta$ | $\pi - 2|\Delta\gamma_1|$ | $\Delta\beta_{N2}$ | $\gamma_{02} \pm \Delta\beta$ |
| $>d_N$ | $-d_\phi$ | + | − | | arc cos $\frac{A_N}{2\Delta P}$ | 0 | | $\gamma_{01} + |\Delta\gamma_1| \pm \Delta\beta$ | $\pi - 2|\Delta\gamma_1|$ | $\Delta\beta_{N2}$ | $\gamma_{02} \pm \Delta\beta$ |
| | $< \phi_0 \leq 0$ | − | + | | | | | or $\gamma_{02} + |\Delta\gamma_1| \pm \Delta\beta$ | $\pi - 2|\Delta\gamma_1|$ | $\Delta\beta_{N2}$ PREDICTION VALUE | $\gamma_{01} \pm \Delta\beta$ OBSERVER VALUE |

$\gamma_{01} = \pi - \alpha$
$\gamma_{02} = (2\pi) - \alpha = \gamma_{01} + \pi$ TAB. 2c INTERVENTION CONDITIONS ($\beta_{N3}$, $\beta_{N4}$) FOR NUTATION DAMPING AT TWO PULSES (ABOUT THE Z-AXIS) PER NUTATION PERIOD

| $A_N$ | $\psi_0 \sim \frac{H_X}{|H_Y|}$ | $\Delta P_3$ | $\Delta P_4$ | $\frac{T_{CZ}\Delta t}{|H_Y|}$ $\frac{A_N}{2\Delta P} \leq 1$ | $\frac{A_N}{2\Delta P} > 1$ | $\pm\Delta\gamma_1$: if | $\beta_{N3}$ [rad] | $\Delta\beta_{N3}$ | $\beta_{N4}$: if $\Delta\beta_{N3} \leq \frac{\pi}{k}$ | $\Delta\beta_{N3} > \frac{\pi}{k}$ |
|---|---|---|---|---|---|---|---|---|---|---|
| $>d_N$ | $<d_\phi$ | − | + | arc cos $\frac{A_N}{2\Delta P}$ | 0 | | $\gamma_{03} + |\Delta\gamma_1| \pm \Delta\beta$ | $\pi - 2|\Delta\gamma_1|$ | $\Delta\beta_{N3}$ | $\gamma_{04} \pm \Delta\beta$ |
| | | + | − | | | | or $\gamma_{04} + |\Delta\gamma_1| \pm \Delta\beta$ | $\pi - 2|\Delta\gamma_1|$ | $\Delta\beta_{N3}$ Prediction Value | $\gamma_{03} \pm \Delta\beta$ OBSERVER VALUE |

$\gamma_{03} = \pi/2 = \gamma_{02} + \pi/2$
$\gamma_{04} = 3\pi/2 = \gamma_{03} + \pi = \gamma_{01} + \pi/2$

ATTACHMENT

Intervention Conditions for an Optimal Spin and Nutation Control (according to WO 89/02622).

The nutation amplitude ($A_N$) is determined from the estimated angular velocity ($\omega_x$, $\omega_z$), the nutation frequency ($\omega_N$) and the moments of inertia ($I_x$, $I_z$) of the lateral axes according to the formula $$A_N = \sqrt{\frac{\hat{w}_x^2}{w_N^2} + \frac{\hat{w}_z^2}{w_x^2} \cdot \frac{I_x}{I_z}} \quad [rad] \tag{B-1}$$

The relationship for the phase angle is as follows:

$$\beta_N = \arctan \frac{\sqrt{I_z/I_x} \cdot \hat{w}_z}{\hat{w}_x} \quad [grd] \tag{B-2}$$

and means that the nutation phase goes through zero when the nutation movement about the second lateral axis (Z-axis) goes through zero and at the same time reaches its maximum ($+A_N$) about the first lateral axis (X-axis) which is orthogonal with respect to it. The signals ($\Delta T_{CX}$, $A_N$, $\beta_N$) formed according to the indicated rules are linked with one another at the output of a modulator or of am amplitude/phase converter in such a manner that the modulator decides on the necessity, the preceding sign and the duration of a control intervention and the output signals of the amplitude/phase converter decide on the point in time of the control intervention ($\Delta T_{CX}$) within a nutation period. Here, a differentiation should be made between two cases, depending on whether the pulse repetition frequency of the modulator requires one or two control interventions per nutation period.

In the former case, a control intervention must be carried out, as indicated by the modulator, according to the duration and preceding sign, in the following range of the nutation angle ($\beta_N$, $0 \leq \beta_N \leq 360°$):

$$\frac{1}{2} \leq \frac{A_N}{\Delta P_X} \leq \frac{3}{2} \tag{B-4}$$

that is, when the momentary value (Equation B-1) of the continuously determined nutation amplitude ($A_N$) generates more than half but less the one and a half the nutation half-cone which is generated by a minimal pulse($\Delta P_X$), wherein:

$$\Delta P_x \hat{=} \frac{\Delta T_{CX}}{|H_y|} = \frac{T_{CX} \cdot \Delta t_{CX}}{|H_y|} \tag{B-5}$$

$$\Delta \gamma(t) \hat{=} \pm \arccos\left( \frac{1}{2} \cdot \frac{A_N}{\Delta P_x} + \frac{3}{8} \cdot \frac{\Delta P_x}{A_N} \right) \tag{B-6}$$

or by approximation:

$$\Delta \gamma(t) \hat{=} \pm \sqrt{1 - \left( \frac{1}{2} \cdot \frac{A_N}{\Delta P_x} + \frac{3}{8} \cdot \frac{\Delta P_x}{A_N} \right)^2} \tag{B-7}$$

and fixed values ($\gamma_0$, $\Delta \beta$), preferably $\Delta \beta \hat{=} 0.1$ rad $\gamma_0 = \pi - \alpha$ for positive control interventions $\gamma_0 = 2\pi - \alpha$ for negative control interventions \hfill (B-8)

If, on the other hand, the nutation amplitude ($A_N$, Equation B-1) is larger or smaller than the indicated barriers, the control intervention should take place in the following range of the nutation angle ($\beta_N(t)$: $0 \leq \beta_N \leq 2\pi$):

$$\gamma_0 - \Delta \beta \leq \beta_N(t) \leq \gamma_0 + \Delta \beta \tag{B-8}$$

wherein:

$\gamma = \gamma_0 + \Delta \gamma$—the optimal phase angle for the control intervention within a nutation vibration;

$T_{CX}$—the torque level of the control intervention;

$\Delta T_{CX}$—the duration of the control intervention commanded by the modulator;

$\alpha$—the diagonal installation angle of the actuator.

The other quantities ($\Delta P_X$, $\gamma_0$, $\Delta \gamma$) are defined by the equations (B-5, B-7, B-8) which describe them.

In the case of two control interventions per nutation period, the first control intervention must be carried out when:

$$\gamma_0 - \Delta \gamma_z - \Delta \beta \leq \beta_{NX}(t) \leq \gamma_0 - \Delta \gamma_z + \Delta \beta \tag{B-3}$$

if:

$$A_N \leq 2\Delta P_X \tag{B-9}$$

in which case, however:

$$\Delta \gamma_1 = \mp \arccos\left( \frac{A_N}{2\Delta P_x} \right) \tag{B-10}$$

and the second control intervention must be carried out when $$\gamma_0 - \Delta \beta \leq \beta_{XZ}(t) \leq \gamma_0 + \Delta \beta \tag{B-11}$$

However, in this case it is not absolutely necessary that the determination of the nutation amplitude ($A_N$) and phase ($\beta_N$) takes place within a shorter time period than what corresponds to half the nutation period ($T_N$). When, for example, because of a high nutation frequency and/or slow data processing in the onboard electronic system, this cannot be ensured, the condition for the 2nd pulse according to Equation B-11 is to be replaced by Equation (B-12):

$$\Delta \beta_{N2}(t) = 2\Delta \gamma_1 + 2n\pi \tag{B-12}$$

wherein $n = 0, 1, 2, \ldots$ and $\beta_{N2} > 0$

If however, $$A_N > 2 \Delta P_X \tag{B-13}$$

then the following should be used $$\Delta \gamma_1 = 0 \tag{B-14}$$

and the two conditions (B-3) and (B-11) change into one another.

Figure 5:
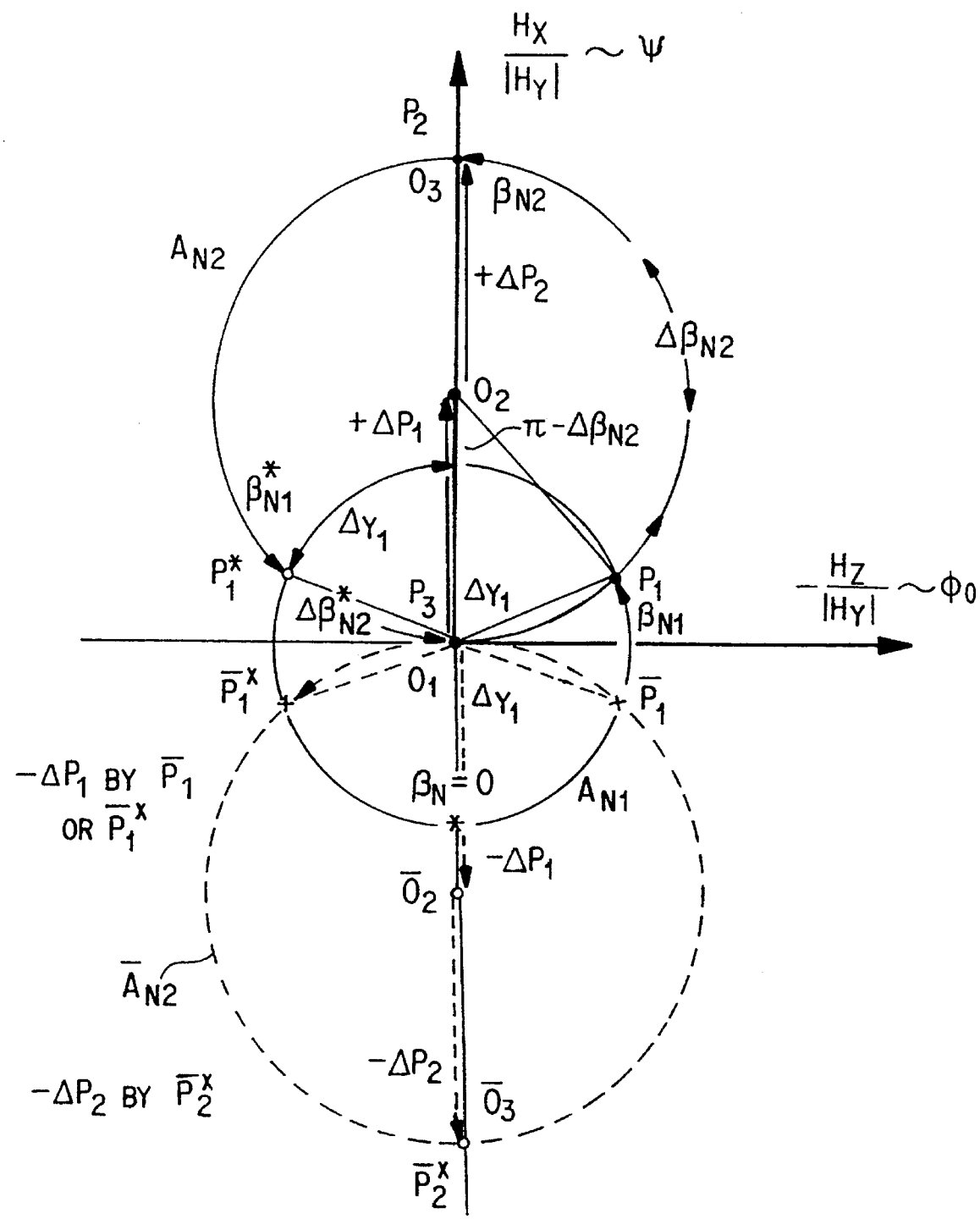
FIG. 5 shows a geometric illustration of the various parameters.

FIG. 5 shows the phase conditions for the spin or nutation control in the case of two control interventions per nutation period about the X-axis (X=0): $+\Delta T$, in the case of $P_1(\beta_{N1})$ or $P_1^*(\beta_{N1}^*)$, $+\Delta P_2$ in the case of $P_2(\beta_{N2}; \Delta\beta_{N2})$ or $-\Delta P_1$ in the case of $\bar{P}_1$ or $\bar{P}_1^*$, $-\Delta P_2$ in the case of $\bar{P}_2^*$.

We claim:

1. A process for controlling the attitude of a three-axis stabilized, spacecraft having a stored spin to maintain a spin direction of the spacecraft in inertial space and limit a nutation amplitude of the spacecraft while using at least one dead zone element, comprising:

continuously checking to determine if predetermined threshold values for deviation of the spin direction from a desired orientation and for nutation amplitude are exceeded using separate dead zone elements to define each of the predetermined threshold value; and triggering control interventions, only for reduction of nutation, even when the spinning direction is within a range limited by the predetermined threshold values.

2. A process for controlling the attitude of a spacecraft having a stored spin which is three-axis stabilized with respect to a presettable desired attitude and is equipped with actuators for generating controlling torques about two lateral axes which are orthogonal with respect to the direction of the stored spin as well as with respect to one another, comprising:

obtaining by at least one attitude sensor, an angular deviation signal which represents an angular deviation of the spacecraft about one of the two lateral axes with respect to the desired attitude;

forming a first and second signal fractions from the angular deviation signal, the first signal fraction being representative of an orbital movement of the spacecraft, the second signal fraction being representative of a nutation movement of the spacecraft;

obtaining from the first signal fraction an input signal for a first dead zone element, the first dead zone element having an output signal;

obtaining from the second signal fraction signals which represent the nutation amplitude and the nutation phase of the spacecraft;

providing the signals representing the nutation amplitude and the nutation phase, and the output signal of the first dead zone element, as inputs to a nutation controller which determines points in time for triggering control interventions by the actuators;

additionally providing the signal representing the nutation amplitude to a second dead zone element that has a threshold value selected according to a presettable highest permissible value for the nutation amplitude, the second dead zone element having an output signal received by the nutation controller and taken into account by the nutation controller for determining a necessity of an additional control intervention.

3. A device for controlling the attitude of a spacecraft having a stored spin which is three-axis stabilized with respect to a presettable desired position, comprising:

at least one attitude sensor for measuring an angular deviation from a desired attitude of the spacecraft about at least one of two lateral axes of the spacecraft that are orthogonal with respect to a direction of the stored spin as well as with respect to one another, the attitude sensor producing an angular deviation signal;

actuators for generating control torques about the two lateral axes;

a controller network coupled to the attitude sensor, the controller network receiving the angular deviation signal and generating therefrom a first signal fraction which represents orbital movement of the spacecraft;

a first device coupled to the attitude sensor and which produces from the angular deviation signal a second signal fraction which represents nutation movement of the spacecraft;

a spin controller coupled to the controller network and which receives the first signal fraction;

a first dead zone element connected to an output of the spin controller;

a second device coupled to the first device, the second device producing from the second signal fraction a signal that represents a nutation amplitude and a signal that represents a nutation phase of the spacecraft;

a nutation controller connected to an output of the second device, an output of the first dead zone element, and the actuators, the nutation controller determining points in time for triggering generation of the control torques; and a second dead zone element coupled to the nutation controller and to an output of the second device, the second dead zone element receiving the signal representing the nutation amplitude and emitting an output signal to the nutation controller.

4. A process for controlling attitude of a three axis stabilized spacecraft, to maintain a spin direction of said spacecraft, said process comprising the steps of:

defining a first threshold value for limiting deviation of a spin direction of said spacecraft from a desired orientation, by means of a first dead zone element;

defining a second threshold value for limiting nutation amplitude for said spacecraft, by means of a second dead zone element, detecting magnitudes of said deviation and of said mutation;

continuously checking to determine if detected magnitude of said deviation and detected nutation amplitude exceed said first and second threshold values, respectively; and triggering a control intervention to reduce said nutation based on a result of said checking step, even when the spin direction is within a range limited by said first threshold value.

* * * * *